US008101225B2

(12) United States Patent
Bialek et al.

(10) Patent No.: US 8,101,225 B2
(45) Date of Patent: Jan. 24, 2012

(54) AERATED FOOD PRODUCT AND A PROCESS FOR PREPARING THE SAME

(75) Inventors: Jadwiga Malgorzata Bialek, Vlaardingen (GB); Matthew Duncan Golding, Vlaardingen (NL); Petrus Wilhelmus N de Groot, Vlaardingen (NL); Sudarshi Tanuja A Regismond, Vlaardingen (NL); Simeon Dobrev Stoyanov, Vlaardingen (NL)

(73) Assignee: Conopco, Inc., Englewood Cliffs, NJ (US)

( * ) Notice: Subject to any disclaimer, the term of this patent is extended or adjusted under 35 U.S.C. 154(b) by 1167 days.

(21) Appl. No.: 11/643,586

(22) Filed: Dec. 21, 2006

(65) Prior Publication Data

US 2007/0178209 A1    Aug. 2, 2007

(30) Foreign Application Priority Data

Dec. 21, 2005 (EP) .................................. 05077966
Dec. 21, 2005 (EP) .................................. 05077967

(51) Int. Cl.
*A23L 1/00* (2006.01)
(52) U.S. Cl. ........................................ 426/564; 426/572
(58) Field of Classification Search .................. 426/564, 426/565, 572
See application file for complete search history.

(56) References Cited

U.S. PATENT DOCUMENTS

| 3,712,865 | A | * | 1/1973 | Thomas et al. | 426/565 |
| 4,107,334 | A | * | 8/1978 | Jolly | 426/7 |
| 4,542,035 | A | * | 9/1985 | Huang et al. | 426/565 |
| 4,985,270 | A | | 1/1991 | Singer et al. | |
| 5,021,248 | A | | 6/1991 | Stark et al. | |
| 2004/0047974 | A1 | * | 3/2004 | Campbell | 426/605 |

FOREIGN PATENT DOCUMENTS

| EP | 0 250 623 | 1/1988 |
| EP | 0 347 237 | 12/1989 |
| EP | 0 352 144 | 1/1990 |
| EP | 0 412 590 | 2/1991 |

OTHER PUBLICATIONS

Marshall et al., Ice Cream, 2000, Aspen Publication, Fifth Edition, pp. 18-19, 64-66, 75-79 (8 sheets).*
European Search Report, EP 05 07 7966, dated May 19, 2006, 2 pp.
International Search Report, PCT/EP2006/012328, mailed Mar. 5, 2007, 3 pp.

* cited by examiner

*Primary Examiner* — Jyoti Chawla
(74) *Attorney, Agent, or Firm* — Ellen Plotkin

(57) ABSTRACT

An aerated food product comprising at least 0.05 wt %, and preferably at most 50 wt %, of hydrophobic denatured protein particles whereby at least 50% of the number of said protein particles have in a hydrated state a diameter of more than 3 micron, and preferably less than 10% of the number of said protein particles have in a hydrated state a diameter of more than 300 micron.

5 Claims, No Drawings

AERATED FOOD PRODUCT AND A PROCESS FOR PREPARING THE SAME

The present invention relates to a novel aerated food product and a process to produce the same.

BACKGROUND OF THE INVENTION

Usually aerated food products such as ice cream and whipped cream comprise of an oil in water emulsion in which gas bubbles are trapped. Aerated food products need to be stabilised to prevent the product from deflating. Traditionally, saturated fatty acids (SAFA) are used. Common sources of SAFA in ice cream are dairy products such as milk or milk powder. Even skim milk powder usually comprises SAFA. When emulsified and cooled the SAFA are present in the form of small fat globules, present in the bulk of the product (continuous phase) and at the surface of gas bubbles. The SAFA in the bulk are believed to form a network, which stabilises the foam by keeping the gas bubbles separated from each other while the SAFA globules at air/water interface prevent liquid oil droplets from spreading at said interface. However the SAFA are known to be less healthy and there is strong desire to decrease the amount of SAFA in food products. The oil phase in the emulsion could comprise liquid oil. However, liquid oil on the other hand such as triglycerides have pronounced antifoaming action and foam stability decreases with the amount of liquid oil added.

Low molecular weight emulsifiers like lecithin may also be used to keep oil in water emulsion emulsified. Other low molecular weight emulsifiers include polysorbate esters, sorbitan esters, polyglycerol esters, propylene glycol monostearate, sodium and calcium stearoyl lactylates, sucrose esters. However, consumers increasingly avoid such additives.

EP 412 590 discloses denatured whey particles in oil free ice-cream like product but no oil containing aerated products.

Therefore there is a need to for alternative processes and stabilisers to prepare aerated foods like products with decreased amounts of SAFA and low molecular weight emulsifiers.

SUMMARY OF THE INVENTION

Surprisingly we have now found that aerated food products can be prepared from emulsions by replacing at least part of the SAFA with liquid triglyceride oils without destabilising the foam structure of aerated food products provided that certain hydrophobic denatured protein particles are used to stabilise the aerated food product. One of the advantages is that the use of such hydrophobic denatured protein particles obviates or at least reduces the need to use SAFA to stabilise the foam structure of aerated food products. Another advantage is that the use of such hydrophobic denatured protein particles obviates or at least reduces the use of.

According to a first aspect of the invention an aerated food product is provided with an overrun of greater than 10%, substantially free from saturated fatty acid comprising at least 0.05 wt %, preferably at least 0.1 wt %, more preferably at least 0.5 wt % and preferably at most 50 wt %, more preferably at most 25 wt %, most preferably at most 10 wt % of hydrophobic denatured protein particles whereby at least 50% of the number of said protein particles have in a hydrated state a diameter of more than 3 micron, preferably more than 5 micron, more preferably more than 7 micron and preferably a diameter of less than 35 micron, more preferably less than 30 micron most preferably less than 25 micron and preferably less than 10% of the number of said protein particles have in a hydrated state a diameter of more than 300 micron and preferably a diameter of more than 200 micron, more preferably more than 50 micron.

DETAILED DESCRIPTION OF THE INVENTION

In respect to the use of the term "protein particle", the term is defined herein as describing a protein particle which in the hydrated state is substantially spheroidal in shape. The protein particles in a hydrated state preferably have diameters (long axes in the case of non-spheres) as defined below. It is understood that said protein particles themselves may comprise of a number of proteins.

In respect to the use of the term "hydrated state", the term is defined herein as being substantially completely saturated with an aqueous solution.

In respect to the use of the term "denatured", the term is defined herein as a change in the three-dimensional conformation, or structure, of a protein from a more ordered state to a less ordered state. In respect to the use of the term "undenatured," the term is defined herein as having a conformation that is substantially unchanged from that of the protein in its native state.

In respect to the use of the term "hydrophobic", the term is defined herein to described protein particles of which average the three-phase contact angle of solid colloid particles adsorbed at the air-water interface is between 60 and 120 degrees, preferably between 70 and 110 degrees, more preferably between 80 and 100 degrees. The contact angle can be measured using the gel-trapping technique as described by technique as described by Paunov (Langmuir, 2003, 19, 7970-7976) or alternatively by using commercial contact angle measurement apparatus such as the Dataphysics OCA20.

In respect to the use of the term "substantially spheroidal in shape", the term is defined herein as encompassing the spectrum of spheroidal shapes, including spheres, and oblate or prolate spheroids. Compositions wherein spheres are the exclusive or predominant species are most preferred. However, the presence of other spheroidal shapes in compositions of the present invention are acceptable, such as rodiform and filamentous particles, and spicular particles.

In respect to the use of the term "solution", the term is defined herein as an aqueous medium wherein protein is dissolved and/or suspended.

'Frozen' as used herein refers to aerated food products that contain part of their composition as ice. The characteristic temperature at which ice forms is dependent on the amount of soluble components in the composition. Typically the temperature at which ice forms in the composition, or at which freezing occurs, is in the range of 0° C. to −5° C., but it may be lower, e.g. 5° C. to −20° C. if a high solids (especially sugar) content is used. A frozen food product is designed to be stored and/or consumed with an ice-phase present.

"Low molecular weight emulsifiers" as used herein refers to lecithin, monoglycerides (saturated and unsaturated), polysorbate esters, sorbitan esters, polyglycerol esters, propylene glycol monostearate, sodium and calcium stearoyl lactylates, sucrose esters, organic acid (lactic, acetic, tartaric, succinic) esters of monoglycerides or mixtures thereof.

The food product of the present invention is an aerated food product and preferably has a overrun of greater than 10%. Even more preferred aerated food products have an overrun of at preferably at least 20%, more preferably at least 75% and preferably at most 200%, more preferably at most 150%, most preferably at most 120%.

The overrun is defined by $$\text{overrun } \% = \frac{\text{density of food product before aeration} - \text{density of aerated food product}}{\text{density of aerated food product}} \times 100$$

Overrun is measured at atmospheric pressure.

Examples of preferred aerated food products include confection like ice-cream, dairy products (e.g. whipped cream, desserts like mousse), (marshmallow like products) and savoury products like vegetable based aerated products well known in the art as souffles. Souffles are generally prepared by forming a mixture of fat, flour and milk or water to which the yolks and whites of eggs, beaten separately, are added. On heating, the mixture expands to give a product with a light, aerated structure.

When the aerated food product is an edible emulsion it may be any emulsion including an oil in water emulsion (O/W), a water in oil emulsion (W/O) duplex emulsions (W/OIW or OIW/O). One preferred emulsion is an oil in water emulsion (OIW). Preferably, the aerated food product according to the invention is an oil in water emulsion.

The preparation of an aerated food product may be achieved through appropriate aeration of the food product and through subsequent stabilisation of the newly formed aerated food product. It is understood that the term aerated is not limited to air but is meant to describe inclusions of any gas in the aerated food product.

There are several processing routes by which aeration of the food product may be accomplished. Most common examples include the use of beating or whipping or whisking using conventional hand operated or electric food mixers or processors. The use of a whisking attachment allows entrainment of air into the food product. The rate of foaming and volume of incorporated is in part dependent on the energy applied to the whisking of the product.

Additional routes of aeration include the use of pressurised aerosol systems containing soluble gases, such as carbon dioxide or nitrous oxide, which on operation release the gas under pressure to form a foam. Insoluble gases, such as nitrogen may also be used to form foams when incorporated into pressurised containers (e.g. the use of so-called "widget" technology in the brewing industry). Further additional processes of aeration include the use of ultrasound, which may also be used to create foam structures through a process of cavitation. Also, foams may also be produced through chemical reaction in which gases, such as carbon dioxide, are formed as a by-product of the reaction.

The aerated food product according to an aspect of the invention comprises at least 0.05 wt %, preferably at least 0.1 wt %, more preferably at least 0.5 wt % and preferably at most 50 wt %, more preferably at most 25 wt %, most preferably at most 10 wt % of hydrophobic denatured protein particles whereby at least 50% of the number of said protein particles have in a hydrated state a diameter of more than 3 micron, preferably more than 5 micron, more preferably more than 7 micron and preferably a diameter of less than 35 micron, more preferably less than 30 micron most preferably less than 25 micron and preferably less than 10% of the number of said protein particles have in a hydrated state a diameter of more than 300 micron and preferably a diameter of more than 200 micron, more preferably more than 50 micron.

The diameters are preferably measured from micrographs using scanning electron microscopy or confocal light microscopy. Alternatively D(3,2) mean diameter may be measured using a Malvern Mastersizer. The diameter of the protein particles in emulsions may be determined by centrifuging the emulsion to isolate the protein particles. When protein particles may be located in the oil-water interface of the emulsion, the emulsion may be treated with an surface active emulsifier such as SDS or polysorbate (x0) in order to remove the particles from the interface. When D(3,2) mean diameters are used then at least 50% of the number of said protein particles have in a hydrated state a diameter of more than 3 micron, preferably more than 5 micron, more preferably more than 7 micron and preferably a diameter of less than 35 micron, more preferably less than 30 micron most preferably less than 25 micron and preferably less than 10% of the number of said protein particles have in a hydrated state a diameter of more than 300 micron and preferably a diameter of more than 200 micron, more preferably more than 50 micron.

The hydrophobic denatured protein particles according to the present invention may be produced from a variety of protein materials. The preferred protein for a particular use may vary according to considerations of availability, expense, and flavor associated with the protein. Additionally, the degree and nature of impurities and other components in the protein source may be considered. Suitable protein sources include plant, dairy, and other animal protein sources. Representative of suitable proteins derived from suitable protein sources is the group consisting of: whey proteins, such as beta-lactoglobulins and alfa;-lactalbumins; bovine serum albumins; egg white and egg yolk proteins, such as ovalbumins; and, soy proteins, such as glycinin and conglycinin. A particularly preferred protein source is egg white. Combinations of suitable proteins are also acceptable for use in the present invention. Especially preferred is a combination of egg white and egg yolk proteins. The proteins may be used as fresh preparations or as powders. For example, in addition to liquid egg white and egg yolk protein preparations powdered preparations are also commercially available.

The hydrophobic denatured protein particles may comprise of one or more proteins. The protein particles may be prepared using a process comprising any combination of the following steps of—in no particular order—denaturing an aqueous solution of the one or more proteins by eg heat, acid, electrolyte or a combination thereof, shearing said protein solution by applying mechanical energy e.g., shearing and/or spray drying said protein solution. Commercially available protein particles include Supergel egg white powder ex Ovobest Eiprodukte Germany. For example, Supergel egg white powder may be dispersed/dissolved in water after 30 sec of ultra sonification. Thereafter, hydrophobic denatured protein particles with a mean diameter of 20 microns may be obtained after an additional 20 min sonification or shearing the solution using a high shear mixer.

According to an especially preferred aspect of the invention, a process is provided whereby hydrophobic protein particles are denatured without a heating step. Hydrophobic protein particles prepared according this process seem to form a protein aggregate. In respect to the use of the term "aggregate", the term is defined herein as describing a multitude of hydrophobic denatured protein particles whereby the particles are contacting each other when viewing a 5 wt % solution of said aggregate in water using scanning electron microscopy or confocal microscopy. The protein particles in a hydrated state preferably have diameters as described above.

It is recognised that protein sources suitable for use in the present invention may contain various impurities and by-products. For example, whey protein concentrates can comprise as much as 40% lactose. The presence of such materials does not substantially affect the process herein. If desired, lactose-free products can be prepared by using conventional extraction procedures.

The inventive protein aggregate may be prepared by a process as described below. Preferably, the pH of an aqueous protein solution of one or more undenatured proteins is decreased to a pH of 5.0 or less, preferably a pH of 4.5 or less, more preferably a pH of 4.0 or less and most preferably a pH of 3.6 or less. Any edible acid may be used such as acetic acid. Although the term "solution" is used, it is recognised that some proteins or mixtures thereof may not be completely soluble.

The protein concentration (based on dry weight of the protein) in the solution is preferably less than 70 wt %, more preferably less than 50 wt % and most preferably less than 30 wt % and preferably more than 1 wt %, more preferably more than 3 wt % and most preferably more than 5 wt % by weight of the total protein solution.

In some cases it may be advantageous to use a protein solution which is free from sugar, preferably selected from saccharose, lactose, glucose trehalose and combinations thereof. Free from sugar is meant to describe a concentration of less than 5 wt %, preferably less than 1 wt % and most preferably less than 0.1 wt % of sugar by weight of the total protein solution. Optionally an electrolyte may be added to the protein solution, preferably less than 10 wt %, more preferably less than 7 wt % and most preferably less than 5 wt % and preferably more than 0.01 wt %, more preferably more than 0.1 wt % and most preferably more than 0.5 wt % by weight of the total protein solution. Any electrolyte of food grade may be used. A preferred electrolyte is selected from sodium chloride, calcium chloride and mixtures thereof. In a particularly preferred embodiment, electrolyte is added before the acidification step.

This process also comprises a step of shearing the protein solution. A sufficient amount of shear is usually a combination of time and shear rate such that the protein particles diameter is as described above and the protein particles form the inventive protein aggregates. The shear is preferably equivalent to a shear of preferably at least 1000 rpm, more preferably at least 2000 rpm, most preferably at least 3000 rpm and preferably at most 25 000 rpm, more preferably at most 15 000 rpm and most preferably at most 10 000 rpm, of a Silverson L4RT-A overhead mixer, using the Square Hole High Shear Screen with 2 mm holes (Silverson), 500 gram protein solution in a 1 L beaker. Preferably the step of shearing the protein solution is carried out after acidification, and if present the addition of electrolyte.

It is critical that the steps above are carried out at a temperature of less than 70 degrees C., preferably less than 60 degrees C., more preferably less than 40 degrees C., most preferably less than 30 degrees C. Optionally, the sheared protein solution may be dried by any means known in the art to form a protein aggregate powder including spray drying.

The aerated food product may be a frozen or non frozen food product. When the food product is a frozen emulsion, the frozen emulsion preferably has a continuous aqueous phase (which may be in a partially or fully frozen state in the frozen product) and a dispersed phase, which may comprise of fat particles, and optionally gel particles and/or flavouring agents. Examples include ice-creams, sherbet, frozen custards, frozen yoghurts, frozen mousses, and other conventionally fat containing frozen (emulsion) confections. A list of typical frozen food products is given in "Ice-cream", by Arbuckle 4th edition, Appendix B and E, published by Van Nostrand Reinhold Company. Also covered by "frozen emulsions" are frozen "microstructured emulsions".

Frozen aerated food products as used herein may include are water ices, sorbets and other conventionally fat free food products having a fat ingredient added thereto. In certain circumstances it may be desirable to include a fat-containing component in a water ice or sorbet, etc., for example to produce a 'creamy' or 'milky' texture, or to allow the introduction of fat-soluble flavours. In such cases, where fat is present in a conventionally fat free product, the water ice or sorbet, etc., falls within the scope of the present invention.

The aerated food product may comprise between 0 and 50 wt % oil phase. Preferably the amount of oil phase is greater than 0.05 wt % and less than 40 wt % oil phase, more preferably less than 30 wt % oil phase, e.g. less than 8 wt % by weight of the food product. For example 0.01-10 wt % oil phase, especially 0.1-8 wt % oil phase is preferred. In some cases, the aerated food composition comprises at least 1 wt %, more preferably at least 3 wt % of oil phase. For example in a low-fat ice-cream the wt % oil phase may be 0 to 8 wt %, preferably 0.1-7 wt %, more preferably 1-6.5 wt %. However in a fat containing water ice or sorbet the wt % oil phase will typically be within the range eg 0.01% to 4.5%, especially 0.1% to 3 wt %, or e.g. less than 2 wt %.

For the purpose of the present invention, the definition of oil phase includes liquid oil, crystallising fat blends, e.g. butter fat, and fat mimics such as sucrose polyesters. The oil of the oil phase may be solid or liquid at room temperature. Any suitable edible oil or fat may be used in the food product. Especially preferred are oils that are liquid at 25 degrees C. Examples include sunflower oil, rapeseed oil, soybean, pumpkin, flax, walnut, hemp, chia, kukui and other vegetable or nut oils. Especially preferred are oils comprising omega 3 and/or 6 fatty acids. However, preferably, the aerated food product is substantially free from SAFA. Substantially free in this respect means less than 3 wt %, preferably less than 1 wt %, more preferably less than 0.01 wt % and most preferably 0 wt % by weight of the food product.

With respect to low molecular weight emulsifiers, the aerated food product is substantially free from low molecular weight emulsifiers. Substantially free from low molecular weight emulsifiers means if that if one or more low molecular weight emulsifiers are present, the amount is insufficient to have an emulsifying effect. More preferably the amount of low molecular weight emulsifiers is less than 1 wt %, even more preferably less than 0.1 wt %, even more preferably, less than 0.01 wt % by weight of the total aerated food product. Most preferably no low molecular weight emulsifiers is present all in the aerated food product.

The aerated food product may further comprise
a) at least 0.1 wt %, preferably at least 2 wt %, more preferably at least 20 wt % and preferably at most 99 wt %, more preferably at most 90 wt %, most preferably at most 80 wt % of an aqueous phase; and
b) optionally at least 0.1 wt %, preferably at least 2 wt %, more preferably at least 5 wt % and preferably at most 50 wt %, more preferably at most 25 wt %, most preferably at most 10 wt % of a flavouring agent by weight of the food product.

Frozen aerated food products, and composite products containing said aerated food products, will typically comprise other conventional food product ingredients such as those selected from colourants, fruit pieces, nut pieces, sauces and couvertures etc., as appropriate.

The standard manufacturing process for frozen aerated food products is described in detail in, for example, "Ice Cream", 6th Edition R. T. Marshall, H. D. Goff and R. W.

Hartel, Kluwer Academic/Plenum Publishers, New York 2003, chapters 6, 7 and 9. It consists of a number of steps: (i) mixing the ingredients, (ii) pasteurisation and homogenisation, (iii) ageing, (iv) aerating and partially freezing the mix of said ingredients in, an ice cream freezer (v) drawing the partially frozen aerated food product from the freezer and (vi) hardening.

Typically ice cream will contain, by weight of the composition, 10-18% fat, 7-11.5% milk solids not fat (abbreviated to MSNF, which contains casein micelles, whey proteins and lactose), 15-18% sugars and other ingredients such as stabilisers and flavourings, and is aerated to an overrun of typically 100%.

Stabilisers may be included in the aerated food product of the invention. Stabilisers that may be used include proteins such as gelatin; plant extrudates such as gum arabic, gum ghatti, gum karaya, gum tragacanth; seed gums such as locust bean gum, guar gum, psyyllium seed gum, quince seed gum or tamarind seed gum; seaweed extracts such as agar, alganates, carrageenan or furcelleran; pectins such as low methoxyl or high methoxyl-type pectins; cellulose derivatives such as sodium carboxymethyl cellulose, microcrystalline cellulose, methyl and methylethyl celluloses, or hydroxylpropyl and hydroxypropylmethyl celluloses; and microbial gums such as dextran, xanthan or β-1,3-glucan. Preferably, the stabiliser is selected from locust bean gum, kappa carrageenan, guar gum or mixtures thereof. Preferably the stabilisers are present at a level of 0.05-1 wt % of the aerated food product.

Sugars are usually present when the aerated food product is a confection. The sugar is typically a mono-, di-, or oligo-saccharide or sugar alcohol for instance, sucrose, dextrose, fructose, lactose (for example from milk solids), purified lactose, lactose monohydrate, glucose syrup, invert sugar, corn syrup, fructose, erythritol arabitol, xylitol, sorbitol, glycerol, mannitol, lactitol and maltitol or mixtures thereof.

When the confection is a frozen aerated food product, in order to provide freezing point depression and contribute to the sweetness of the confection it is preferred that the confection comprises at least 5% sugars, more preferably at least 8% and most preferably at least 10% by weight of the frozen confection. To avoid a frozen confection being too sweet, it is preferred that the confection comprises at most 25% sugars, more preferably at most 20% and most preferably at most 18% by weight of the frozen confection. Where large freezing point depression is required, so that the frozen confection produced is soft, low molecular weight molecules such as fructose may be selected. Preferably a blend of sugars is used; more preferably one of the sugars is sucrose.

An especially preferred aerated food product according an aspect of the invention is an aerated edible emulsion comprising the inventive hydrophobic denatured protein aggregate whereby the protein aggregate is located in the oil water interface of the emulsion. Another preferred food product according to an aspect of the present invention is an aerated edible emulsion comprising the inventive protein aggregate whereby said protein aggregate at least partly encapsulates at least 50% of the number of droplets in the emulsion. Preferably, the edible emulsion is an oil in water emulsion. The location of the protein aggregate can be easily seen using confocal laser scanning microscopy or scanning electron microscopy.

In addition to the hydrophobic denatured protein particles, the aerated food product may further comprise one or more undenatured proteins. If one or more undenatured proteins are used, the one or more undenatured proteins may be the same or different from the protein(s) present in the protein aggregate. The one or more undenatured protein may be selected from the group as described above for the protein aggregate.

According to yet another aspect of the invention a process is provided to prepare an aerated edible food emulsion comprising the steps of
a) Dispersing the hydrophobic denatured protein particles in an aqueous phase;
b) Optionally adding one or more undenatured proteins;
c) Emulsifying oil phase, the aqueous phase and the hydrophobic denatured protein particles to form an emulsion;
d) Optionally, homogenising the obtained emulsion; and
e) Optionally, flavouring agents may be added after each of the previous steps using amounts of the various ingredients as described above.
f) Aerating said emulsion When the emulsion is homogenised any means known to the person skilled in the art may be used. Preferred means include colloid mills (eg. ex Ross) or inline homogenisers (eg. ex. Maelstrom IPM).

According to yet another aspect of the invention a process is provided to stabilise an aerated food product comprising adding a protein aggregate according to any aspect of the invention to a food product.

In one particularly preferred embodiment, the food product is a non-frozen aerated edible food emulsion further comprising
a) at least 0.1 wt %, preferably at least 2 wt %, more preferably at least 20 wt % and at most 70 wt %, preferably at most 60 wt %, most preferably at most 50 wt % of an oil phase;
b) at least 0.1 wt %, preferably at least 2 wt %, more preferably at least 20 wt % and preferably at most 99 wt %, more preferably at most 90 wt %, most preferably at most 80 wt % of an aqueous phase; and
c) optionally at least 0.1 wt %, preferably at least 2 wt %, more preferably at least 5 wt % and preferably at most 50 wt %, more preferably at most 25 wt %, most preferably at most 10 wt % of a flavouring agent, all by weight of the food product.

Any flavouring agent known in the art for food product may be used. This includes sucrose, mustard, herbs, spices, lemon and mixtures thereof. Optionally other food additives may be used such a EDTA.

Other than in the examples, or where otherwise indicated, all numbers expressing quantities of ingredients or reaction conditions used herein are to be understood as modified in all instances by the term "about". Similarly, all percentages are weight/weight percentages unless otherwise indicated. Where the term "comprising" is used in the specification or claims, it is not intended to exclude any terms, steps or features not specifically recited. When different ranges are specified, all sub ranges subsumed therein are also included. All cited references are, in relevant part, incorporated by reference.

To illustrate the invention, the following non-limiting examples are given below.

EXAMPLES

Examples 1 to 10

Preparation of Aerated Food Products Stabilised by Hydrophobic Denatured Protein Particles Oil-in-water emulsions were prepared by dispersing a given amount of protein powder in deionized water using a Silverson L4RT-A overhead mixer at 7000 rpm. Then sunflower oil was added and emulsified using either the Silverson mixer with medium grid at highest shear or a Branson Sonifier 450. Type and amount of protein, amount of sunflower oil and emulsification method are given in the table below.

After the emulsions were prepared 250 ml of it was introduced in 0.5 l ISI professional whipping apparatus, which is an aerosol-can used for whipping cream preparation. The emulsions where pressurised at ~8 atm, using a standard ISI patron containing N2O, shaken well and sprayed into a 500 ml measuring cylinder. The foam height was monitored as a function of time from the foam formation.

| Example | Protein type | Protein (wt %) | Oil (wt %) | Emulsification method |
|---|---|---|---|---|
| 1 | Supergel EW | 1 | 0 | none |
| 2 | Supergel EW | 1 | 20 | Ultrasonic |
| 3 | Supergel EW | 0.5 | 20 | Ultrasonic |
| 4 | Supergel EW | 2 | 20 | Ultrasonic |
| 5 | Supergel EW | 1 | 10 | Ultrasonic |
| 6 | Protein aggregates according example 14 | 5 | 0 | Silverson |
| 7 | Protein aggregates according example 14 | 5 | 10 | Silverson |
| 8 | Protein aggregates according example 14 | 5 | 20 | Silverson |
| 9 | Protein aggregates according example 14 | 5 | 10 | Ultrasonic |
| 10 | Protein aggregates according example 14 | 5 | 20 | Ultrasonic |

The hydrophobic denatured protein particle prepared from Supergel EW (eggwhite) powder (Ovobest Eiprodukte Germany) had a mean diameter, D[3,2] of 22.5 micron. Aerated products according to the invention showed an excellent foam stability in absence of saturated fatty 5 acid and low weight emulsifier, even in the presence of 20 wt % sunflower oil.

Examples 11 to 17

Preparation of Protein Aggregates Comprising a Multitude of Hydrophobic Denatured Protein Particles Seven examples of protein aggregates were prepared as outlined below using different weight ratios of egg yolk (EY) and egg white (EW). 500 g of a protein solution prepared with liquid undenatured egg protein preparations was acidified using glacial acetic acid until a pH of 3.5 was reached. Mixtures were stirred constantly but gently until the desired constant pH is reached. 1 wt % of salt was added and the protein solution was sheared in a IL beaker with an Silverson L4RT-A overhead mixer, using the Square Hole High Shear Screen with 2 mm holes (ex Silverson) for 3 minutes at 3000 rpm to form protein aggregates. The protein aggregate was stored in plastic tub at 5 degrees C. until further use. When viewing a 5 wt % solution of said aggregate in water using scanning electron microscopy or confocal microscopy it could be seen that the particles were contacting each other and seemed to form networks.

| Example | Weight ratio egg white (EW) to egg yolk (EY) | wt % dry protein* | Final pH | Acid Added (gram) | NaCl (wt %) |
|---|---|---|---|---|---|
| 11 | 100EW | 10 | 3.5 | 55.1 | 1 |
| 12 | 20EY/80EW | 11.3 | 3.5 | 53.5 | 1 |
| 13 | 40EY/60EW | 12.6 | 3.5 | 47.7 | 1 |
| 14 | 50EY/50EW | 13.25 | 3.5 | 45.3 | 1 |
| 15 | 60EY/40EW | 13.9 | 3.5 | 40.3 | 1 |
| 16 | 80EY/20EW | 15.2 | 3.5 | 40.9 | 1 |
| 17 | 100EY | 16.5 | 3.5 | 39.5 | 1 |

Acid used = glacial acetic acid
*= % dry protein for mixtures of yolk and white were calculated based on an average protein concentration in egg white of 10% and in egg yolk of 16.5%, respectively.

The invention claimed is:

1. A process for preparing an aerated edible food product with an overrun of greater than about 10%, said aerated food product comprising:
   a. less than about 3 wt. % saturated fatty acid;
   b. at least about 0.05 wt. %, and at most about 50 wt. %, of hydrophobic denatured protein particles whereby at least about 50% of the number of said protein particles have in a hydrated state a diameter of more than about 3 micron, and less than about 35 micron, and less than about 10% of the number of said protein particles have in a hydrated state a diameter of more than about 300 micron; wherein the hydrophobic denatured protein particle is located in the oil water interface of the emulsion;
   c. between about 0.05 wt. % and about 40 wt. % of an oil phase;
   d. at least about 0.1 wt. %, and at most about 99 wt. % of an aqueous phase;
   and
   e. optionally at least about 0.1 wt. %, and at most about 50 wt. % of a flavoring agent by weight of the food product; and wherein said aerated food product is non-frozen;
said process comprising the steps of
   A. denaturing without a heating step an aqueous solution of one or more proteins selected from the group consisting of whey protein, egg white protein, egg yolk protein, soy protein and combinations thereof by acid, electrolyte or a combination thereof and shearing said protein solution at a temperature of less than 60 degrees C. to obtain denatured hydrophobic protein particles;
   B. dispersing the hydrophobic denatured protein particles in an aqueous phase;
   C. emulsifying oil phase, the aqueous phase and the hydrophobic denatured particles to form an emulsion; and
   D. aerating said emulsion.

2. The process according to claim 1, wherein said aerated food product is substantially free from low molecular weight emulsifiers.

3. The process according to claim 1, wherein said hydrophobic denatured protein particles comprise more than one protein.

4. The process according to claim 1, wherein said hydrophobic denatured protein particles form a protein aggregate comprising of a multitude of hydrophobic denatured protein particles whereby at least about 50% of the number of said protein particles have in a hydrated state a diameter of more than about 3 Micron, and a diameter of less than about 35 micron, and less than about 10% of the number of said protein particles have in a hydrated state a diameter of more than about 300 micron.

5. The process according to claim 1 comprising denaturing the aqueous;solution of one or more proteins by adding an edible acid to decrease the pH to a pH of about 4.5 or less, said protein solution having a protein concentration of more than about 3 wt.% and less than about 30 wt.%.

* * * * *